UNITED STATES PATENT OFFICE.

SIDNEY W. STEINER, OF NORRISTOWN, PENNSYLVANIA.

NON-CONDUCTING COMPOSITION OF MATTER FOR COVERING STEAM PIPES, BOILERS, OR OTHER SURFACES.

SPECIFICATION forming part of Letters Patent No. 505,426, dated September 19, 1893.

Application filed April 5, 1893. Serial No. 469,201. (No specimens.)

*To all whom it may concern:*

Be it known that I, SIDNEY W. STEINER, a citizen of the United States, residing in the borough of Norristown, Montgomery county, Pennsylvania, have invented a new and Improved Non-Conducting Composition of Matter for Covering Steam Pipes, Boilers, or other Surfaces, to prevent the radiation of heat from within and without, of which the following is a specification.

The invention consists in combining and incorporating lime cement and vegetable animal or mineral fiber in such way as to produce a plastic mass or mixture that may be applied to the surface of a boiler, a steam pipe or other body to be protected against the radiation of heat. By the term "lime cement," I mean a hydrate of lime of about the consistency of cream obtained by slacking quick lime with an excess of water so that it will readily flow through a screen having mesh of about forty to the inch, and allowing it to stand for a time to become thoroughly hydrated. In practice, I use such an excess of water that the hydrated lime settles to the bottom of the lime box leaving a stratum of water above the cement. This practice, however, is not necessary, the formation of a perfect hydrate of the consistency of cream being the essential condition to produce lime cement. The product of the process above noted, which I call "lime cement," is mixed or incorporated with about equal proportions of vegetable animal or mineral fiber, the fiber being moist, or water being added during the mixing process in order that the product of the mixture will be a plastic mass adapted to be spread over surfaces such as boilers or heating or refrigerating pipes.

The composition of matter above described, is applied with a trowel or other proper implement to surfaces where desired and dried, and when dried the fibers of the compound are impregnated with and covered by hydrate-of-lime crystals, thereby binding the fibers together, as well as rendering said fibers fire and water proof.

I am aware that lime putty, consisting of lime mixed with water so as to be of the consistency of glaziers' putty has been used in connection with non-conducting fibrous material as an ingredient in a composition for covering steam boilers, &c. But in such case, a cementatious or binding ingredient, as plaster of paris or water lime cement is required to bind the constituents of the body together. I do not, therefore, claim a non-conducting composition for covering steam boilers, &c., consisting of lime putty and fiber or its equivalents, but What I do claim is—

A non-conducting composition for coverings for steam boilers, tubes, &c., consisting of vegetable animal or mineral fiber and the hydrate of lime of about the consistency of cream, as described, incorporated together, as set forth.

SIDNEY W. STEINER.

Witnesses:
 LIZZIE WEISS,
 WILLIAM F. SLINGLUFF.